US010564865B2

(12) United States Patent
Ish et al.

(10) Patent No.: US 10,564,865 B2
(45) Date of Patent: Feb. 18, 2020

(54) LOCKLESS PARITY MANAGEMENT IN A DISTRIBUTED DATA STORAGE SYSTEM

(71) Applicant: Seagate Technology LLC, Cupertino, CA (US)

(72) Inventors: Mark Ish, Sandy Springs, GA (US); Anant Baderdinni, Lawrenceville, GA (US); Balakrishnan Sundararaman, Austin, TX (US); Shashank Nemawarkar, Austin, TX (US)

(73) Assignee: Seagate Technology LLC, Cupertino, CA (US)

( * ) Notice: Subject to any disclaimer, the term of this patent is extended or adjusted under 35 U.S.C. 154(b) by 252 days.

(21) Appl. No.: 15/077,420

(22) Filed: Mar. 22, 2016

(65) Prior Publication Data

US 2017/0277450 A1    Sep. 28, 2017

(51) Int. Cl.
*G06F 3/06* (2006.01)
*G06F 12/08* (2016.01)
*G06F 12/0866* (2016.01)

(52) U.S. Cl.
CPC ............ *G06F 3/0619* (2013.01); *G06F 3/065* (2013.01); *G06F 3/0613* (2013.01); *G06F 3/0656* (2013.01); *G06F 3/0659* (2013.01); *G06F 3/0685* (2013.01); *G06F 3/0688* (2013.01); *G06F 12/0866* (2013.01); *G06F 2212/1032* (2013.01); *G06F 2212/214* (2013.01)

(58) Field of Classification Search
CPC ...... G06F 3/0619; G06F 3/0613; G06F 3/065; G06F 3/0656; G06F 3/0659; G06F 3/0685; G06F 3/0688; G06F 12/0866; G06F 2212/1032; G06F 2212/214
See application file for complete search history.

(56) References Cited

U.S. PATENT DOCUMENTS

| 5,636,355 | A | * | 6/1997 | Ramakrishnan .... G06F 12/0804 711/113 |
| 5,684,944 | A | | 11/1997 | Lubbers et al. |
| 5,761,534 | A | | 6/1998 | Lundberg et al. |
| 5,778,430 | A | | 7/1998 | Ish et al. |

(Continued)

OTHER PUBLICATIONS

WOW:Wise Ordering for Writes—Combining Spatial and Temporal Locality in Non-Volatile Caches by Gill (Year: 2005).*

(Continued)

*Primary Examiner* — Paul M Knight
(74) *Attorney, Agent, or Firm* — Hall Estill Attorneys at Law (57) ABSTRACT

Method and apparatus for managing data in a distributed data storage system. In some embodiments, a plurality of storage devices define an overall available memory space. A control circuit stores a first copy of user data from a selected distributed data set in a working set of memory buffers, stores a duplicate, second copy of the user data in an alias set of memory buffers, generates parity data based on the second copy of the user data in the alias set of the memory buffers, and flushes the user data and the parity data from the alias set of memory buffers to the storage devices while the first copy of the user data remains in the working set of the memory buffers. In this way, subsequently received access commands can be serviced using the working set of the memory buffers.

20 Claims, 10 Drawing Sheets

(56) References Cited

U.S. PATENT DOCUMENTS

| | | | |
|---|---|---|---|
| 5,881,250 A * | 3/1999 | Young | G06F 13/387 710/22 |
| 6,173,361 B1 * | 1/2001 | Taketa | G06F 11/1076 711/113 |
| 6,192,450 B1 * | 2/2001 | Bauman | G06F 12/0804 711/133 |
| 6,430,654 B1 * | 8/2002 | Mehrotra | G06F 12/0859 711/118 |
| 6,457,064 B1 | 9/2002 | Huff et al. | |
| 6,725,226 B2 | 4/2004 | Brinkmeyer | |
| 7,334,007 B2 | 2/2008 | Cabrera et al. | |
| 7,426,611 B1 * | 9/2008 | Gupta | G06F 12/0897 711/113 |
| 7,529,886 B2 | 5/2009 | Emmes et al. | |
| 7,657,654 B2 | 2/2010 | Cohen et al. | |
| 7,818,609 B2 | 10/2010 | Benhanokh et al. | |
| 7,945,542 B2 | 5/2011 | Bakey | |
| 8,051,114 B2 | 11/2011 | Dodge | |
| 8,412,752 B2 | 4/2013 | Dodge | |
| 8,537,825 B1 | 9/2013 | Mimms | |
| 8,549,230 B1 | 10/2013 | Chatterjee et al. | |
| 8,621,134 B2 | 12/2013 | Ish | |
| 9,049,242 B2 | 6/2015 | Lubbers | |
| 9,880,750 B1 * | 1/2018 | Ravindran | G06F 3/0613 |
| 2002/0007439 A1 * | 1/2002 | Gharachorloo | G06F 12/0826 711/119 |
| 2002/0108017 A1 * | 8/2002 | Kenchammana-Hoskote | G06F 12/0804 711/113 |
| 2006/0174067 A1 * | 8/2006 | Soules | G06F 12/0804 711/135 |
| 2006/0277347 A1 * | 12/2006 | Ashmore | G06F 3/0611 710/313 |
| 2007/0005627 A1 | 1/2007 | Dodge | |
| 2007/0011563 A1 * | 1/2007 | Tsang | H03M 13/2906 714/758 |
| 2007/0028051 A1 * | 2/2007 | Williamson | G06F 12/0864 711/128 |
| 2012/0066441 A1 * | 3/2012 | Weingarten | G06F 11/1068 711/103 |
| 2013/0111145 A1 | 5/2013 | Ish | |
| 2013/0262398 A1 | 10/2013 | Gygi et al. | |
| 2013/0290667 A1 | 10/2013 | Dixit et al. | |
| 2014/0156954 A1 * | 6/2014 | Janakiraman | G06F 9/526 711/152 |
| 2014/0165073 A1 * | 6/2014 | Carlstedt | G06F 9/48 718/104 |
| 2014/0301549 A1 * | 10/2014 | Guleria | G09C 1/00 380/44 |
| 2014/0372833 A1 * | 12/2014 | Liang | G06F 11/1068 714/773 |
| 2015/0095696 A1 * | 4/2015 | Hess | G06F 11/108 714/6.24 |
| 2015/0143045 A1 * | 5/2015 | Han | G06F 12/0862 711/122 |
| 2015/0234612 A1 * | 8/2015 | Himelstein | G06F 13/00 714/6.21 |
| 2015/0331720 A1 * | 11/2015 | Huetter | G06F 9/544 718/104 |
| 2015/0342095 A1 * | 11/2015 | Tanaka | G06F 3/06 361/679.51 |
| 2016/0308968 A1 * | 10/2016 | Friedman | H04L 67/2842 |

OTHER PUBLICATIONS

Performance Study of RAID-5 Disk Arrays with Data and Parity Cache by Mishra (Year: 1996).*

Enabling Cost-Effective Flash based Caching with an Array of Commodity SSDs by Oh; ACM 2015 (Year: 2015).*

The lockless page cache by Corbet; as found at https://lwn.net/Articles/291826/ (Year: 2008).*

PSP-Cache: A Low-Cost Fault-Tolerant Cache Memory Architecture by Farbeh (Year: 2014).*

Guidelines to Design Parity Protected Write-back L1 Data Cache by Ko (Year: 2015).*

CPPC: Correctable Parity Protected Cache by Manoochehri (Year: 2011).*

A Lockless Pagecache in Linux—Introduction, Progress, Performance by Piggin 2006 (Year: 2006).*

* cited by examiner

LOCKLESS PARITY MANAGEMENT IN A DISTRIBUTED DATA STORAGE SYSTEM

SUMMARY

Various embodiments of the present disclosure are generally directed to a method and apparatus for managing data in a distributed data storage system.

In some embodiments, the apparatus has a plurality of storage devices defining an overall available memory space for storage of data in the form of distributed data sets in which user data and parity data are striped across the storage devices. The apparatus further has a plurality of memory buffers, and a control circuit. The control circuit is configured, responsive to a first access command associated with a selected distributed data set, to store a first copy of user data from the selected distributed data set in a working set of the memory buffers, to store a duplicate, second copy of the user data in an alias set of the memory buffers, to generate parity data based on the second copy of the user data in the alias set of the memory buffers, to flush the user data and the parity data from the alias set of memory buffers to the storage devices, and to concurrently service a second access command associated with the selected distributed data set using the first copy of the user data in the working set of the memory buffers.

In other embodiments, a distributed data storage system has a plurality of data storage devices and a storage server connected to manage the data storage devices. The storage server has a plurality of memory buffers and a control circuit configured to store a first copy of user data associated with a selected distributed data set in a first set of the memory buffers, to duplicate the user data to form a second copy of the user data in a second set of the memory buffers, to generate parity data responsive to the second copy of the user data and store the parity data in the second set of the memory buffers, to update the first copy of user data in the first set of the memory buffers and to flush the user data and the parity data from the alias set of memory buffers to the storage devices.

In still other embodiments, a computer implemented method includes steps of receiving an access command to store a selected distributed data storage set as striped user data and parity data blocks across a plurality of data storage devices; storing the user data in a first set of memory buffers; copying the user data to a second set of memory buffers while retaining the user data in the first set of memory buffers; generating parity data responsive to the user data in the second set of memory buffers; and flushing the user data from the second set of memory buffers and the parity data to the data storage devices.

DETAILED DESCRIPTION

The present disclosure is generally directed to data storage systems, and more particularly to a method and apparatus for enhancing the writing of data in a distributed data storage system.

Data storage devices store and retrieve data from a host device in a fast and efficient manner. Such devices are often provided with a top level control circuit (controller) and one or more forms of data storage media, such as rotatable magnetic recording media (discs) in hard disc drives (HDDs) or solid-state memory cells in solid-state drives (SSDs).

Large-scale (also referred to as "multi-device" or "mass") data storage systems are formed by combining a number of storage devices into a larger memory space. Generally, SSDs tend to have higher performance characteristics such as higher I/O throughput rates but at a higher cost per unit memory, whereas HDDs tend to have greater storage capacities at lower cost per unit memory, but lower I/O throughput rates. Storage systems can incorporate either or both HDDs and SSDs, as well as other forms of storage devices, to tailor the system to the needs of the end user.

Distributed data storage systems distribute data sets across multiple devices, such as in the case of RAID (redundant arrays of independent discs) storage systems. Depending on the format, the distributed data set may be arranged into blocks, or stripes of user data and parity data units of selected size, with a single block, or strip, stored to a different data storage device.

The storage devices in a distributed data storage system may be controlled by server with a specialized control circuit sometimes referred to as an aggregator. The aggregator can function to provide connectivity to multiple storage devices as well as other data management services such as providing low latency write back caching, data protections and placement techniques that improve the endurance of the SSDs, etc.

Traditionally, the data protection can involve techniques such as mirroring (RAID1) or parity striping (RAID5). RAID 5 is generally suitable for SSDs and other solid-state storage solutions such as flash based storage systems because it uses less space for redundancy than RAID1, and SSDs tend to be more expensive than spinning hard drives. However, many RAID5 implementations suffer from performance problems because they are mostly designed for slow hard drives and have a lot of lock contentions for critical resources. These designs are also usually built in software and require significant CPU involvement and memory accesses to do the necessary computations. Most of these designs fail to get most out of the SSDs ability serve IOs and become bottleneck in scaling to the performance that SSDs offer.

Accordingly, various embodiments of the present disclosure are generally directed to a data management scheme whereby distributed data sets (such as RAID 5 data with parity) are managed in a data storage system, particularly one in which SSDs are utilized to provide enhanced data transfer capabilities. The system is designed around improved efficiencies by providing write hole protection and lock-less cache mechanisms during data transfers.

As discussed herein, "write hole protection" generally refers to protecting against mismatches in revision level between user data and parity data, thereby creating a "hole" that has to be recalculated before the data can be returned. "Lock-less caching" means allowing ongoing data accesses while the data are still being updated to the storage devices (rather than "locking" out such accesses), which necessarily includes both parity updates and data updates. Basically, a large data structure is generated and maintained that provides status information for every data block in the system, and the system uses this data structure to carry out these operations.

As explained below, some embodiments include the use of a hashing scheme that includes a hash function calculation to determine if there is a hit or miss for a given LBA range within a stripe. In order to do this, the hash function determines the range of hash slots that belong within a stripe and looks up that entire range for a hit/miss determination. The hash function computes a lower slot and an upper slot that identifies the stripe boundary and scans within those slots for a hit or a miss.

In further embodiments, a novel data structure construct referred to as a "stripe segment" keeps indices (pointers) to all the cache segments that belong to a RAID stripe (e.g., set of RAID data striped, or distributed, across multiple devices). This gives a quick reference and access to all the cache segments that belong to a particular stripe. Each cache segment also maintains pointers to the stripe segment to which it belongs.

A cache segment management block manages a collection of buffers that belong to the same stripe, which is made up of a collection of strips. The management block maintains bitmaps for quick reference to buffers which indicate data that are in a dirty state or a free state, etc. A buffer segment keeps information about each buffer and its state information.

Parity determination for a given stripe begins after a flush operation is started to flush good data to the array. The method of parity generation is determined by an independent logic circuit, which may take the form of a state machine. The state machine generates internal SGLs (iSGL) in a sequence of steps and sends them to appropriate modules for further processing. The flow of information for a read modify write or a group write operation are pre-determined.

One issue that the various embodiments address in an efficient way is a power failure during a write operation. A RAID 5 write hole may exist if, during a write update to memory a power fail event places the parity data out of sync with the data. The design proposed by the present disclosure protects against write hole issues using a combination of self-journal in-memory data structures and non-volatile memory. The transfer of user data and parity data to backend devices is handled as an atomic operation. In order to achieve this, an alias of each dirty cache segment is created just before the parity computation begins. All the alias-dirty cache segments along with parity cache segment form an atomic group. Once parity is computed the state information within cache segment for parity reflects that parity has been computed for the group. This group now contains all the information required to simply replay the writes if a power fail event occurs anywhere in the middle of data transfer from the group to the backend devices.

Upon a power-fail, the alias-dirty cache segments, stripe segment and the parity cache segment provide all the information required to replay the writes. Stated another way, the system maintains sufficient information to retry the writes if a power failure occurs during a write so that not all of the write data and parity data have been successfully transferred to the memory. If a power fail happens before the parity is completely computed, the parity cache segment state information will reflect that. This helps the logic to re-start the entire process of parity computation for the group.

If the parity has been computed and the power fail happens after writes for data and parity have been issued to the backend, then the logic block looks at the current state of parity and figures out the entire atomic group by the information contained within each stripe segment. Because a non-volatile memory holds cached data, all the relevant data and the metadata exist in memory after the power fail. The logic block simply replays all the writes required for the group to the backend devices. This operation is repeated for the groups that are in this state. Once the group has been flushed to the backend, the corresponding cache segment state information is updated to mark all the dirty buffers as non-dirty.

In a typical RAID 5 system, there may be multiple processes trying to operate on regions where information (e.g., a common resource) is changing or being updated by one or more of the operating processes. Examples of common resource are parity or part/entire stripe of data when a drive (or other storage device) is missing due to malfunction. A common way of protecting such regions is to use locks for the entire region and let every process acquire lock before proceeding to access the region. This allows serializing access to the region and maintains data integrity. While operable, one of the problems associated with such an approach is that managing locks and accesses becomes very memory and computationally intensive process thus impacting IO performance, not to mention the reduction in I/O performance while the failed device is rebuilt. In this disclosure, the same common architecture that is used for caching to provide serialized access to each critical region, thereby addressing both of these issues.

Figure 1:
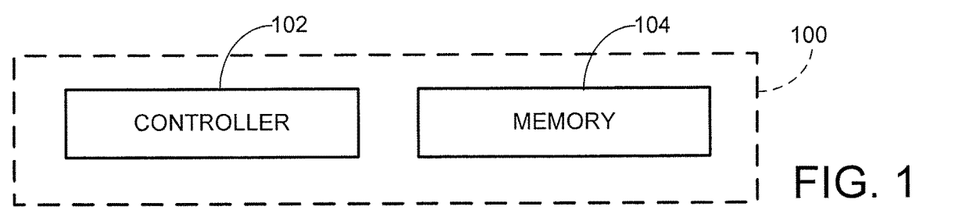
FIG. 1 is a simplified functional block diagram of a data storage device constructed and operated in accordance with various embodiments of the present disclosure.

These and other features of various embodiments of the present disclosure can be understood beginning with a review of FIG. 1 which provides a simplified representation of a data storage device 100 of the type used to store and retrieve user data from a host device. The device 100 includes a controller (control circuit) 102 and a memory module 104. The controller 102 provides top level communication and control functions as the device interfaces with the host device. Data from the host device is transferred for storage in the memory 104.

The controller 102 (control circuit) may be in the form of a hardware or programmable processor. In the latter case, programming steps may be provided in a suitable memory location accessed by the processing unit and executed to carry out various functions including those set forth below. The memory module may include non-volatile memory and control circuitry such as in the form of read/write channel circuitry, data buffers, encoding/decoding circuitry, etc. While not limiting, it is contemplated in some embodiments that the storage device 100 is a solid state drive (SSD) and the non-volatile solid state memory comprises flash memory.

Figure 2:
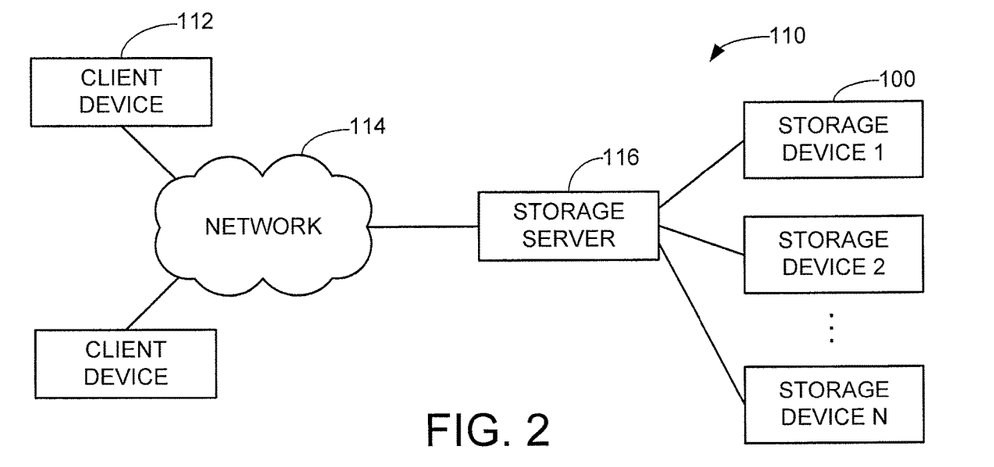
FIG. 2 shows a distributed data storage system that enables client devices to access data storage devices such as set forth in FIG. 1 across a network.

FIG. 2 shows a diagram for a distributed data storage system 110 made up of a plural number N of the storage devices 100 from FIG. 1. The storage system 110 is accessed by a number of client (host) devices 112 via a network 114 and storage server 116. The client devices 112 can be any suitable network accessible device including but not limited to desktop computers, laptop computers, tablets, smart phones, gaming systems, or any other form of processing device with network communication capabilities.

The network 114 can take any suitable form including a local area network (LAN), wide area network, wireless network, the Internet, etc. The storage server 116 can include one or more controllers (control circuits) formed of hardware and/or programmable processors to manage the storage devices. The storage server 116 may embody various control circuits and memory locations as set forth below to control the flow of data sets to the storage devices (also referred to as the "backend" or "backend devices").

The storage devices 100 form a consolidated storage space. Data may be stored to the storage devices in the form of distributed data storage sets, such as RAID data sets (redundant arrays of independent discs), etc. Without limitation, it will be contemplated that at last some data sets are stored in accordance with the RAID5 standard so that a RAID5 stripe of data is arranged into strips of user data and parity data that are stored on respective ones of the storage devices 100.

Figure 3:
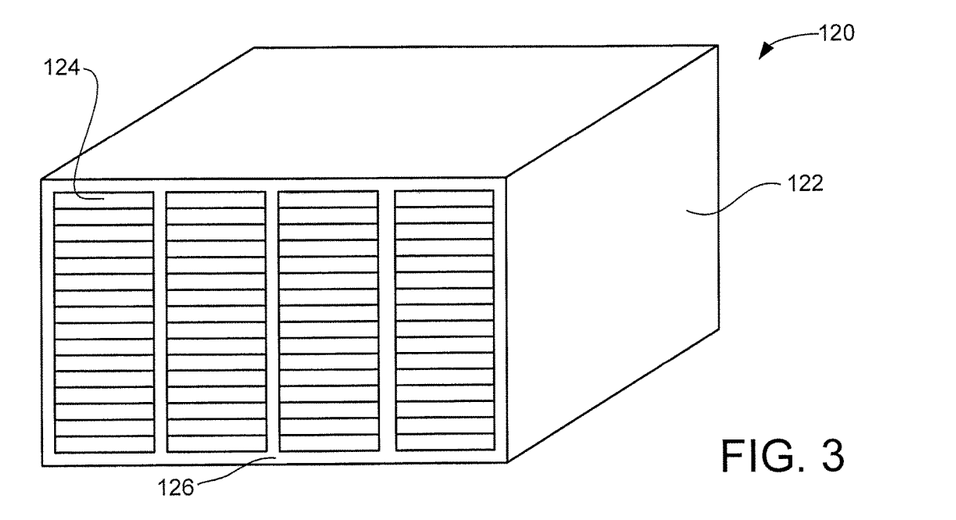
FIG. 3 is a multi-device storage enclosure that can be used to arrange the storage devices in FIG. 2.

For reference, FIG. 3 shows a multi-device storage enclosure 120 in which the storage devices 100 of FIG. 2 may be arranged. The enclosure has a rigid rectangular housing 122 that may be rack mounted in a data center or other large scale data storage environment. The storage devices 100 may be arranged on retractable trays 124 that extend through a front facing surface 126 of the enclosure 120. Control circuitry including circuitry of the storage server 116 (FIG. 2) may also be enclosed within the enclosure 120 as required.

Figure 4:
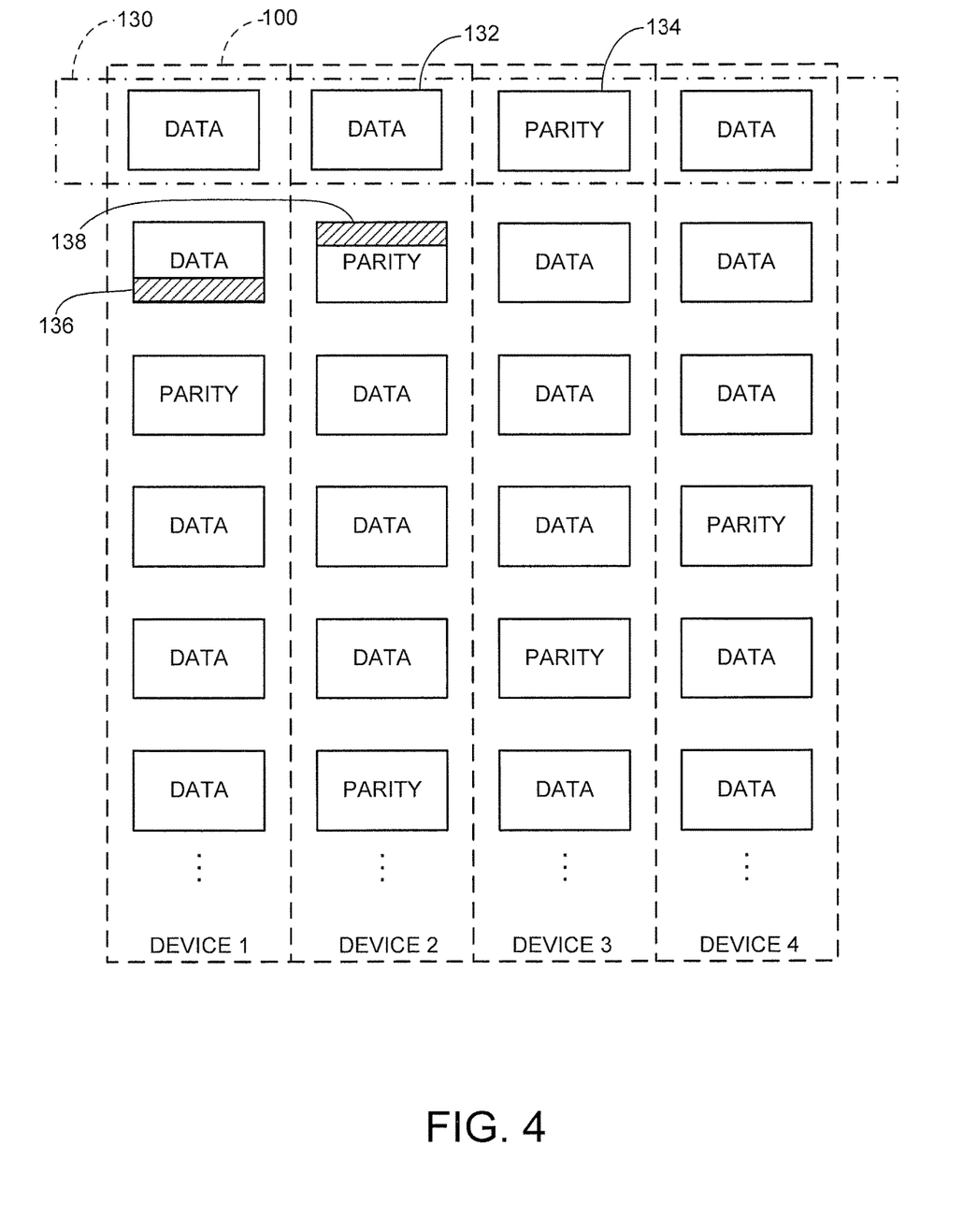
FIG. 4 illustrates an exemplary distributed data storage scheme that can be used in accordance with some embodiments to store user data and parity data blocks across multiple data storage devices.

FIG. 4 represents four storage devices 100 from FIGS. 2-3 to generally illustrate a manner in which data sets may be distributed thereacross by the storage server 116. One data set is denoted at 130, and represents a number of user data blocks (strips) 132 and parity blocks (strips) 134. The respective user data and parity data blocks are distributed across the devices 100 (referred as Devices 1-4) as shown, with one block per device. Other arrangements can be used.

A data update is shown to be carried out to update some of the data in an existing storage set, with updated user data represented by hashed region 136 and updated parity data represented by hashed region 138. The manner in which such updates may be carried out in accordance with various embodiments will now be discussed beginning with FIG. 5, which provides a hash table 140 arranged to describe the memory space defined by the storage devices 100.

Figure 5:
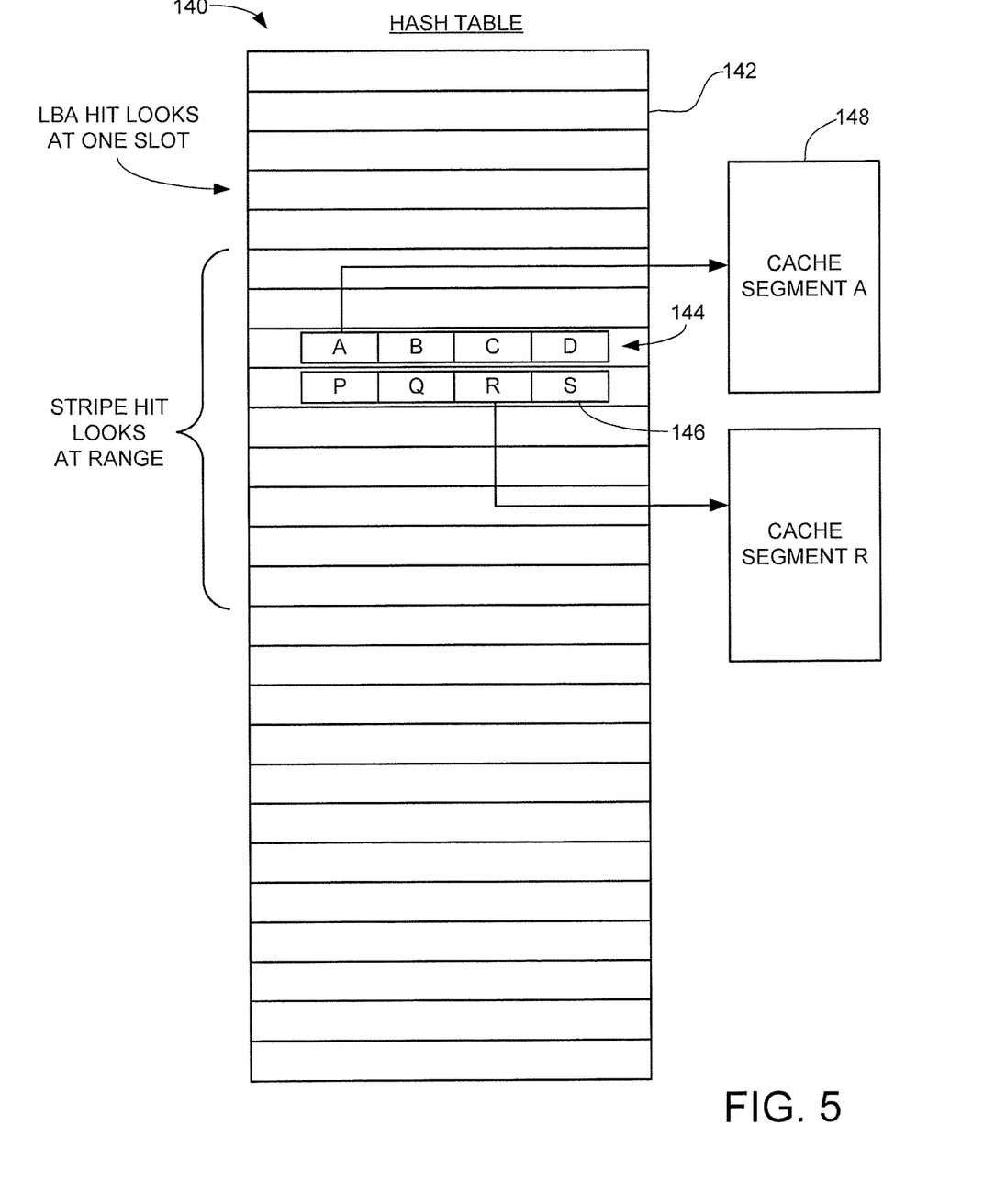
FIG. 5 illustrates a stripe segment and cache segment data structure arrangement used by various embodiments.

The hash table 140 includes a number of entries (rows) 142 that define a certain range of the logical space of the memory devices. In the present example it will be presumed that the data presented to the backend storage devices 100 are described using logical addressing in the form of logical block addresses (LBAs). Other suitable forms of addressing may be used so that LBAs are contemplated but not necessarily required. It is contemplated that the hash table 140 and other data structures disclosed herein may be maintained in a suitable memory location such as accessible by the control circuitry of the remove server 116 (FIG. 2).

When processing an access command associated with a selected logical address (e.g., a selected LBA or range of LBAs), two different methods may be utilized to access the hash table 140. A first access method (e.g., first hash function) can involve extracting the bottom n bits of the vector {VD_ID, LBA[35:4]} where n is the log of the number of entries in the hash table. For example, if the hash table has 512K slots, then n would be equal to 19. Checking the appropriate slot would provide a hit or miss for the desired LBA.

A second method disclosed herein involves computing a lower slot and an upper slot that define a stripe boundary and scanning the entries within this range for a hit or miss for the selected LBA. The lower slot can be calculated as LOW_LBA=(LBA[35:4]~(stripe size−1)), where stripe size is expressed in LBAs and extract bottom "n" bits of the vector {VD_ID, LOW_LBA[35:4]}. The upper slot can be calculated as being below UP-PER_LBA=((LBA[35:4]+stripe size)~(stripe size−1)) where stripe size is expressed in LBAs and extract bottom "n" bits of the vector {VD_ID, UPPER_LBA[35:4]}.

In either case, each entry 142 in the hash table 140 may be arranged to store a stripe segment data structure 144. Two such data structures 144 are denoted in FIG. 4, one as set {A, B, C, D} and the other as set {P, Q, R, S}. As noted above, the stripe segment data structure 144 is maintained in a suitable memory location (such as a memory of the remote server 116 in FIG. 2) and maintains a list of indices (pointers) to all the cache segments that belong to a RAID stripe (e.g., 130 in FIG. 4).

Figure 6:
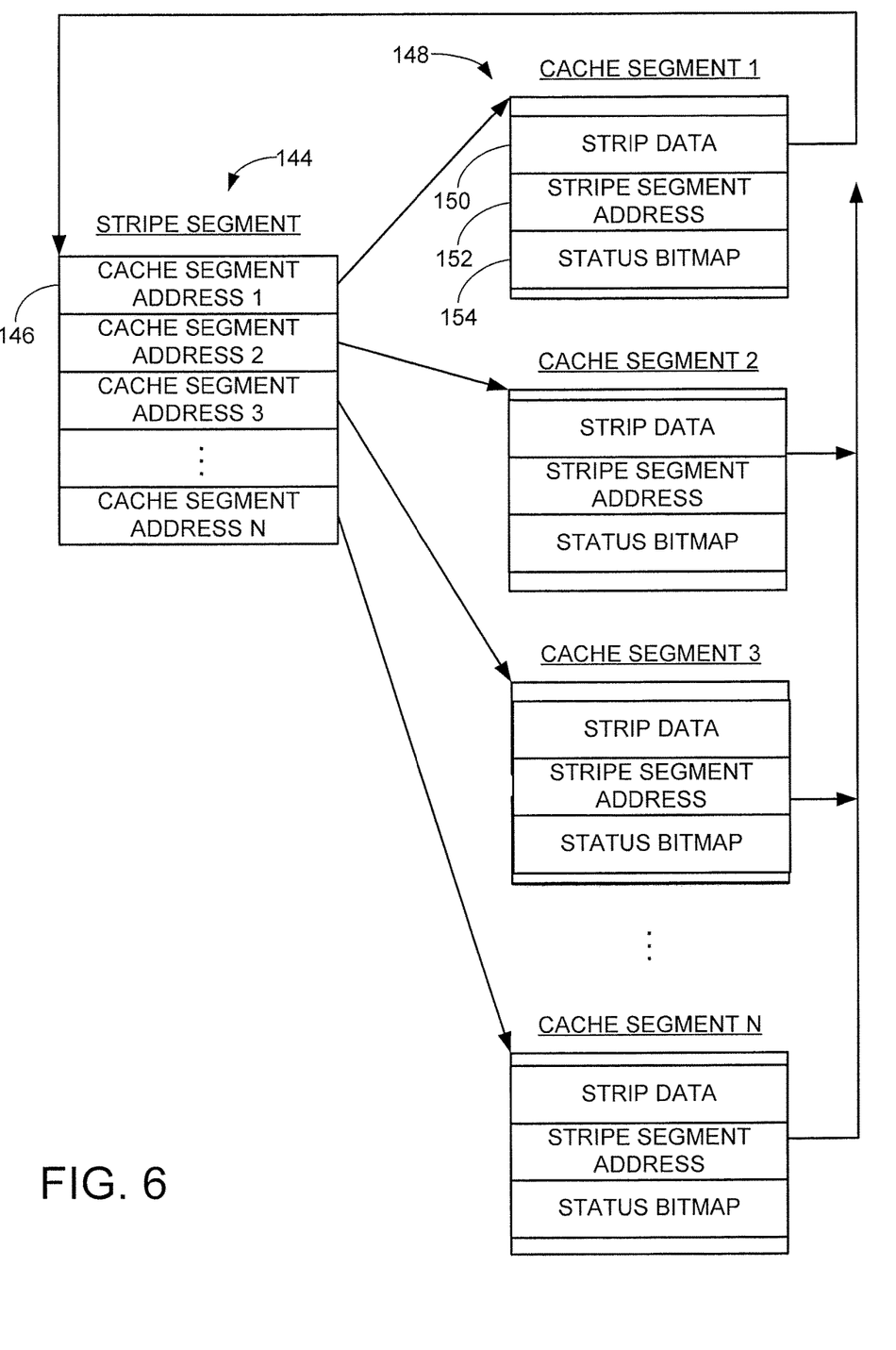
FIG. 6 shows a data management circuit of the distributed data storage system operative in accordance with various embodiments.

As further shown in FIG. 6, an exemplary stripe segment data structure 144 is shown to include N cache segment address values 146, with each value pointing to the address of a separate cache segment 148. Each of the cache segments 144 may form separate memory locations (caches or buffers) in which the associated strip (user or parity) data 150 are stored, and also include stripe segment address values 152 that point to the stripe segment 144 to which the associated cache segment belongs. In this way, quick and easy access can be provided to all of the cache segments that belong to a particular stripe 130 using scatter/gather list (SGL) processing.

Each cache segment 148 manages a collection of buffers that belong to the same strip, and can maintain bitmaps 152 for quick reference of the state of the buffers (e.g., dirty data, free buffers, etc.).

Figure 7:
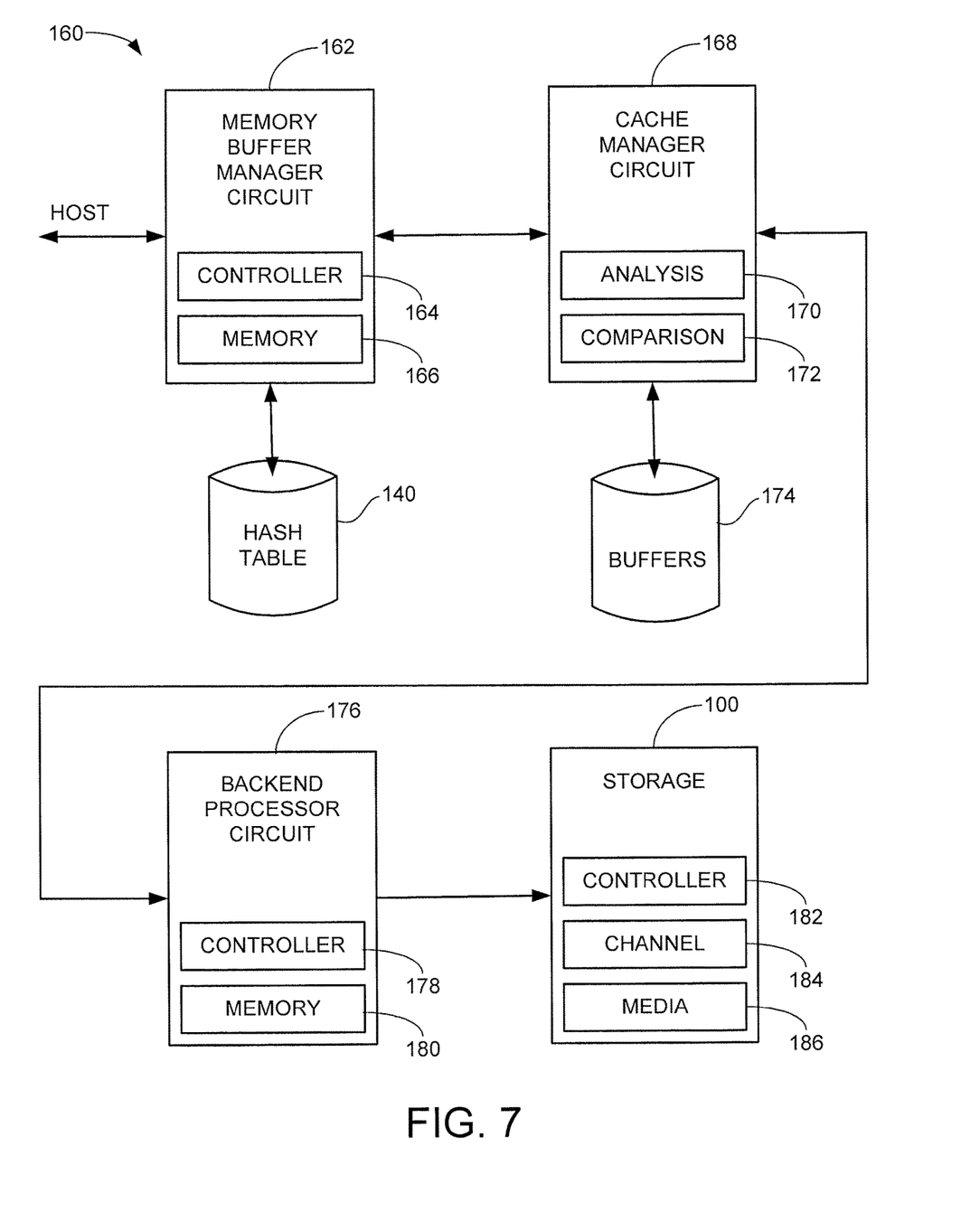
FIG. 7 is a timing sequence for the circuit of FIG. 6 during a read modify write (RMW) sequence.

FIG. 7 is a functional block representation of circuit elements 160 of the system 110 arranged to utilize the data structures of FIGS. 5-6 in accordance with some embodiments. It will be appreciated that the system can be realized in a number of different forms including hardware circuits, programmable processors, buffers, cache memory, and other devices and so FIG. 7 is merely provided as one processing environment and is not limiting. In some embodiments, all of the circuitry 160 except for the storage can be essentially realized by one or more processors executing programming in associated memory along with suitable volatile and non-volatile memory storage elements. In other embodiments, the various circuit elements can be independent logic units.

A memory buffer manager circuit 162 provides top level control of the processing of data access operations with a host device (such as a selected client device or other upstream device). The memory buffer manager circuit 162, also referred to hereinbelow as the "memory buffer manager," includes a controller (control circuit) 164 and memory 166. The hash table 140 can be stored in the memory 166 or in another suitable location accessible by the memory buffer manager circuit. It is contemplated albeit not necessarily required that the hash table be maintained in non-volatile memory, such as NOR flash memory, STRAM, RRAM, etc.

A cache manager circuit 168 cooperates with the memory buffer manager circuit 162 and provides data and control status exchanges therewith as explained below. The cache manager circuit 168, also referred to a "cache manager," can include or otherwise access an analysis circuit 170 and a comparison circuit 172 for use in analyzing various access operations in which data transfers take place. One or more physical data buffers are represented at 174, and these can correspond to the various cache buffers mentioned above.

In some embodiments, the cache manager circuit 168 is arranged as an independent state machine that operates to generate parity values for a given stripe after the flush operation has begun. The state machine generates internal scatter/gather lists (iSGLs) in a sequence of steps and sends them to the appropriate modules for further processing. The flow of information for various types of writes such as a read modify write or a group write operation are predetermined and efficiently executed.

A backend processor circuit is denoted at 176. This processor executes data exchanges with individual data storage devices 100 responsive to the processing carried out by the respective manager circuits 162 and 168. As before, the circuit 176 includes controller circuitry 178 and memory 180. A single storage device 100 is shown with controller (control circuit) 182, channel 184 and media 186, but it will be appreciated that any number of storage devices can be accessed and concurrently directed by the circuit 176. In the context of the current example, the storage devices 100 are SSDs so that the controller 182 is a programmable processor which executes programming in memory, the channel 184 is a read/write/erase (R/W/E) channel and the media 186 is flash memory.

Figure 8:
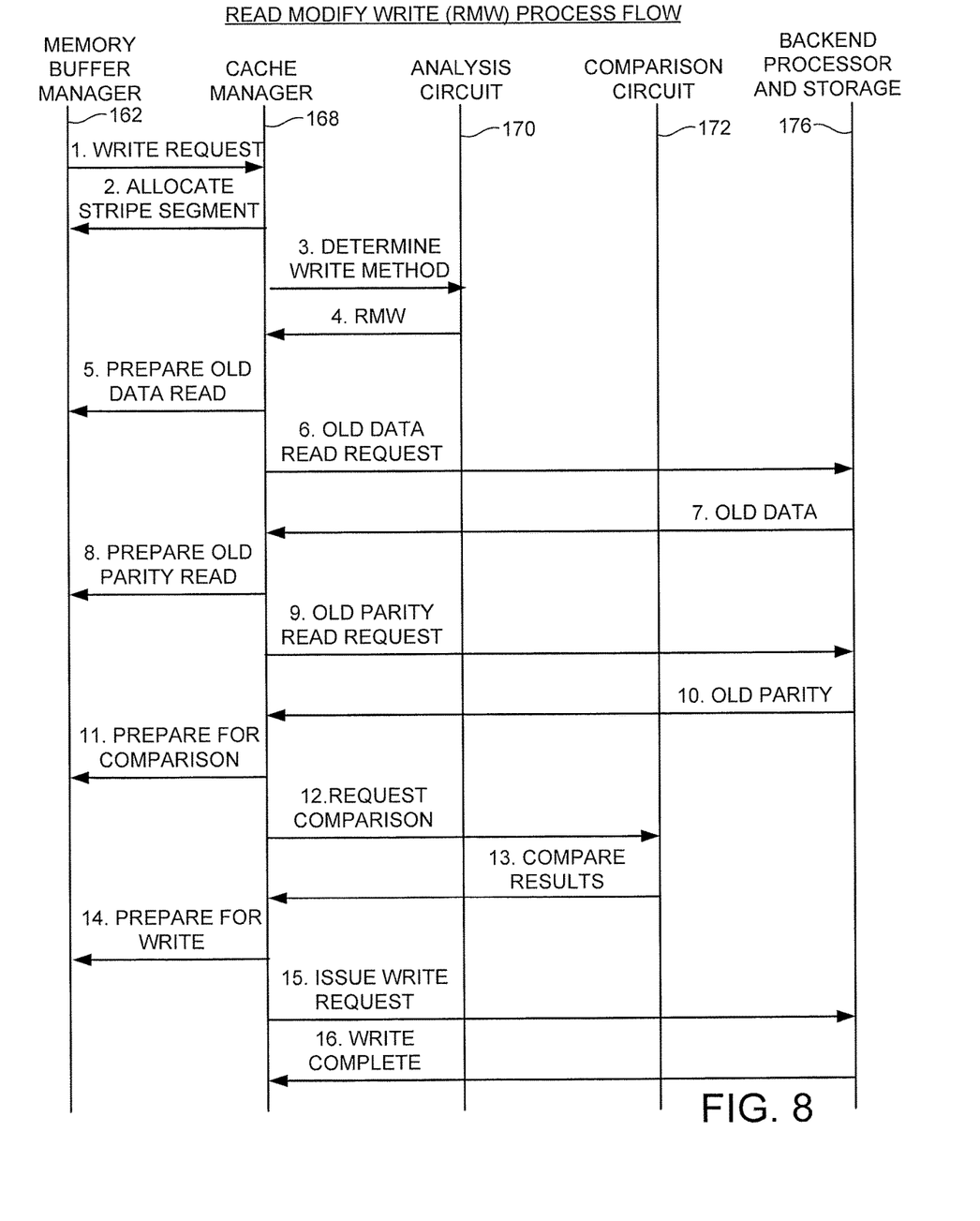
FIG. 8 is a timing sequence for the circuit of FIG. 6 during a peer write (PR) sequence.

FIG. 8 is a timing diagram to illustrate a sequence of operations carried out during a read/modify/write (RMW) operation. As will be appreciated, an RMW operation generally involves the reading of an existing set of data previously stored to the memory space, modifying the data (such as with updates) and then writing the updated data set back to the memory space. In some cases, the RMW operation may constitute a partial update operation so that less than the full data set may be written (along with updated parity). In other cases, a full write of a new set of the data may be written, as desired.

The processing in FIG. 8 will be understood to include reference to the hash table 140 and other data structures set forth above to track the respective aspects of the data set prior to the final writing thereof to the storage devices. For example, the locations of various buffers to maintain old and new user data, old and newly recalculated parity data, etc., will be tracked and managed atomically. Various SGL requests can be made to gather data and address information to prepare for the writing of the data.

The process flow begins with the receipt of a write operation from an upstream device (such as a selected client device) at the memory buffer manager level. Each of the steps listed in FIG. 8 are provided in numerical sequence, and each will be so identified in turn. At step (1), the write request is forwarded to the cache manager, which in response (2) communicates a request to prepare for a data flush operation and allocate a stripe segment to accommodate the data write. At step (3), the cache manager determines the write method to be employed during the write operation by forwarding a request to the analysis circuit. The analysis circuit evaluates the form of the command or other data to determine that the write operation should be performed as a read-modify-write (RMW). This status is returned at step (4).

At step (5), the cache manager issues a request to the memory buffer manager to prepare to receive old data associated with the stripe segment. This may include the allocation of appropriate buffers and the issuance of appropriate iSGL values for the old data. The cache manager issues a request to read the old data to the back end processor 176, step (6), and the data are returned at step (7), including a notification to the cache manager to that effect.

At step (8), the cache manager next issues a request to the memory buffer manager to prepare for old parity data and issues iSGLs for the same. The cache manager issues a read request for such data to the backend processor at step (9). The data are returned at step (10) and the cache manager is notified. At step (11), the cache manager instructs the memory buffer manager to prepare for a comparison operation, which is requested at step (12) and returned (by the comparison circuit) at step 13. The comparison step can involve the old data, the new data and the parity data, and may be performed using an XOR engine. The comparison enables the system to determine the extent to which new parity data need to be calculated, and such operation is carried out at this time in response to the comparison operation.

Once the completed data set is ready and stored in the respective cache segments identified by the stripe segment data structure, the cache manager issues a request to prepare for the writing of the data to the memory buffer manager at step (14), and issues the write request at step (15) to the backend processor. At this point the backend processor receives the updated user and parity data and directs the local storage of such to the applicable data storage devices, as generally represented (for example) in FIG. 4. At the conclusion of a successful write operation, a write complete status is returned at step (16). As desired, a write complete status can be forwarded to the issuing host.

Figure 9:
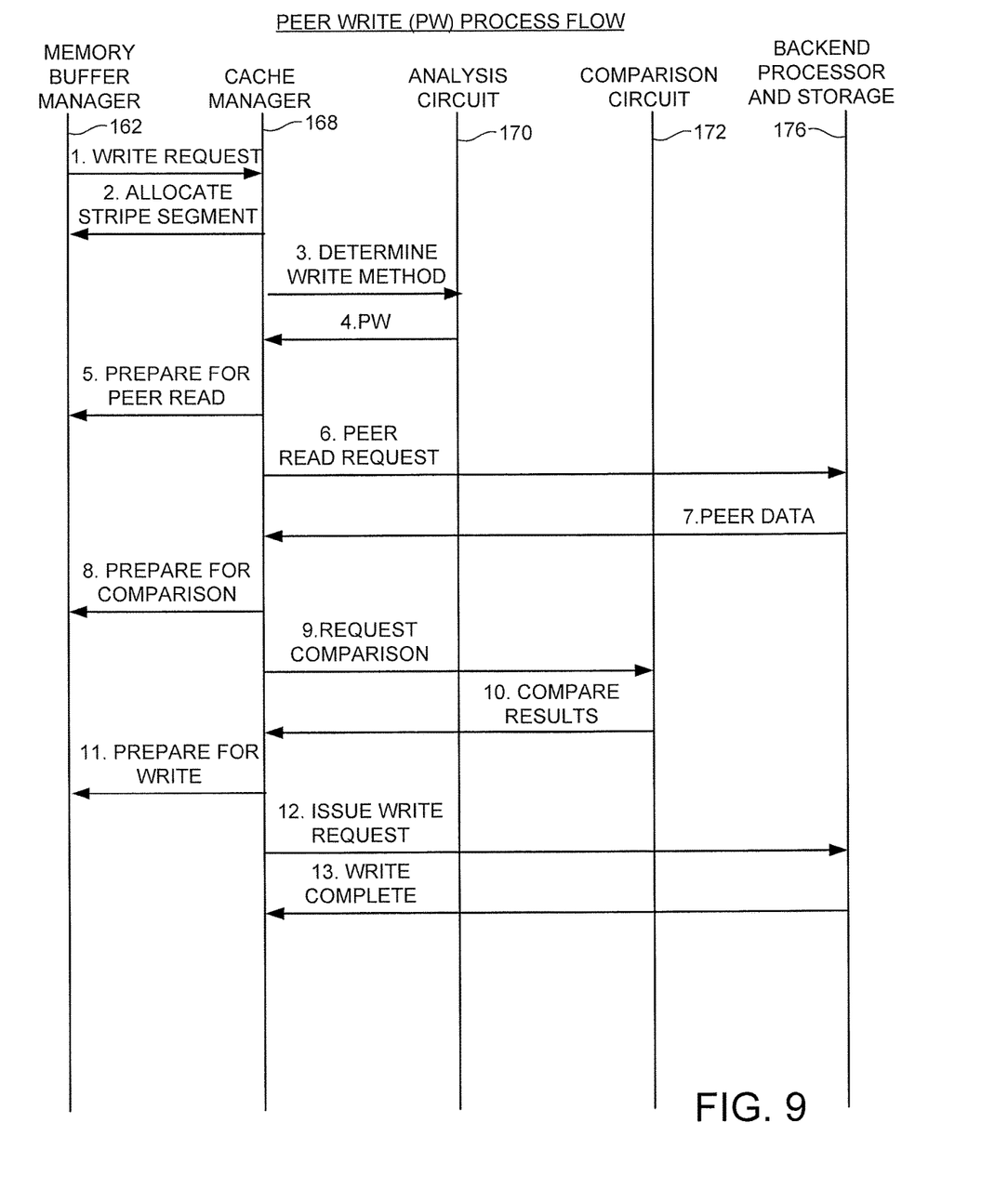
FIG. 9 is a timing sequence for the circuit of FIG. 6 during a group write (GR) sequence.

FIG. 9 illustrates a peer write (PR) operation process flow. A PR operation is similar to a RMW operation except that the old data set is not recovered from the storage media. Therefore, details described above in the RMW operation may be carried out during the PR operation as well, but such will not be repeated for brevity of explanation.

As before, the process flow begins responsive to receipt of a write request (1) which is forwarded to the cache manager. An appropriate stripe segment is allocated (2) and the write method is determined (steps (3) and (4). The cache manager prepares for the peer read (5) and requests peer data from the backend processor (6). The peer data is returned (7) and compared (steps (8), (9) and (10)). As before, based on the comparison, the final data set to be written is assembled and sent to the backend for writing (steps (11), (12) and (13).

Figure 10:
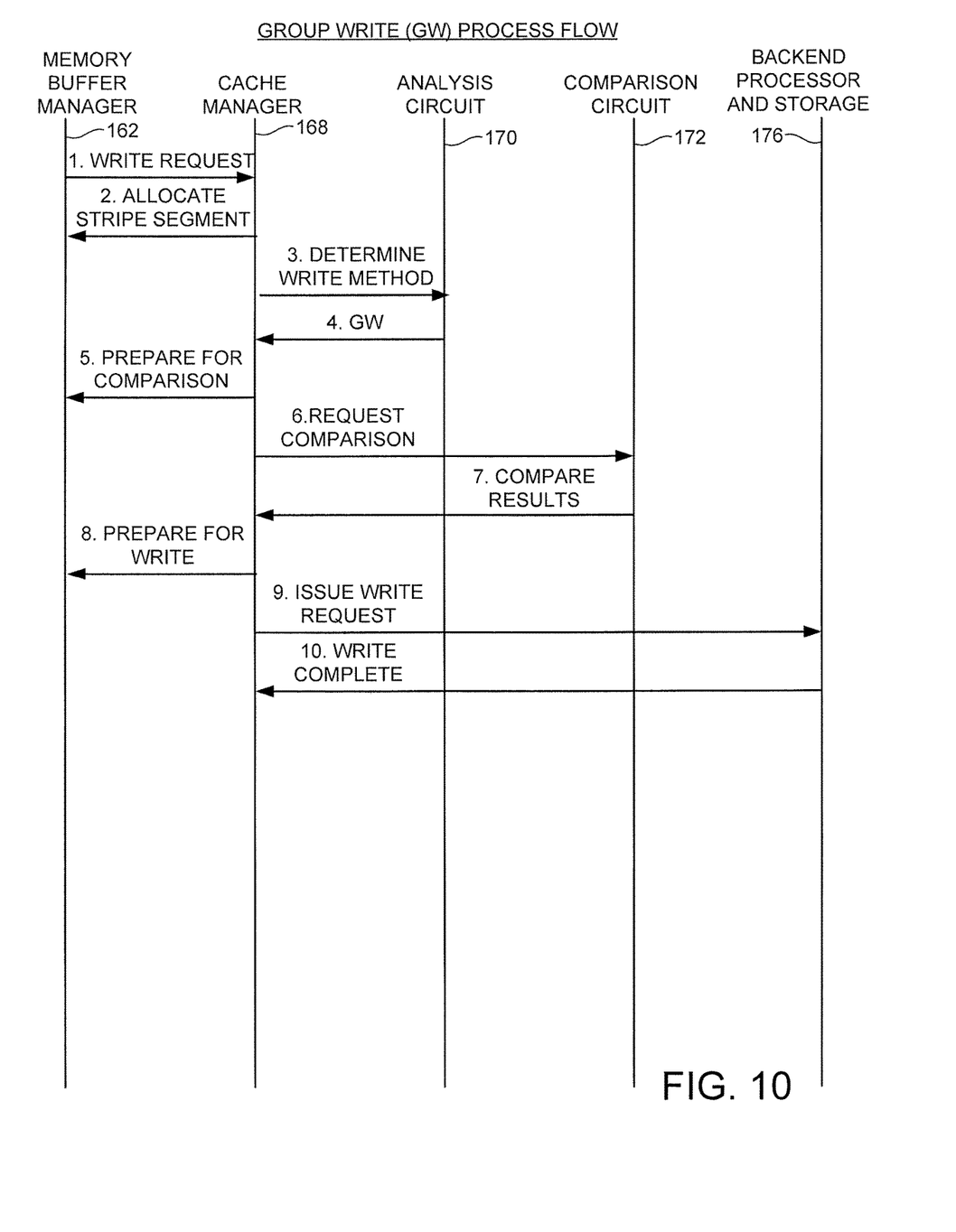
FIG. 10 is a functional block representation of steps carried out by the circuit of FIG. 6 in accordance with some embodiments.

FIG. 10 illustrates a group write (GW) operation. A GW operation is similar to the RMW and PR operations discussed above, except that no reading of existing data from the storage media is performed. A GW operation may be suitable, for example, when a new data set is being presented for storage that has not been previously stored to the media.

A write request is received (1) and an appropriate stripe segment is identified (2) based on the logical addressing of the write data. A determination of the write method as a group write is made at steps (3) and (4). Because data have not been previously written, the comparison engine instead receives and compares source and destination iSGLs and returns the comparison results (steps (5), (6) and (7)). The parity values are calculated and the data are written (steps (8), (9) and (10)).

Figure 11:
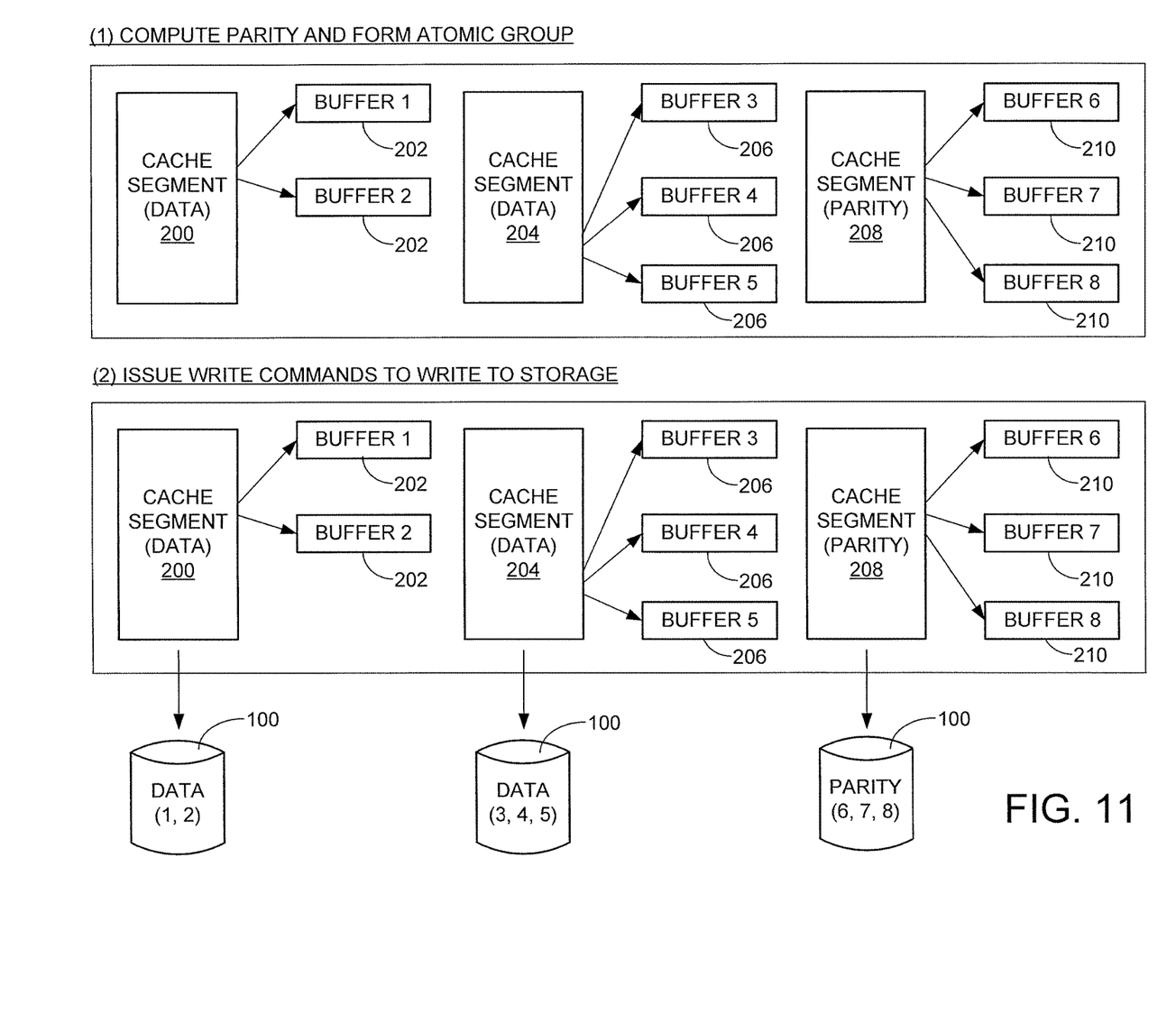
FIG. 11 is a functional representation of steps carried out during data transfers in accordance with some embodiments.

FIG. 11 shows another write sequence carried out by the system in accordance with various embodiments. The system illustrates a first cache segment 200 for user data stored in a first pair of buffers 202 (buffers 1 and 2), a second cache segment 204 for user data stored in a second set of buffers 206 (buffers 3-5), and a third cache segment 208 for parity data stored in a third set of buffers 210 (buffers 6-8). In this particular example, all of the user data and parity data in the respective buffers are arranged to form an atomic group at a first step in the process (step (1)). This includes calculating updated parity values based on the processing set forth above in respective FIGS. 8-10. It is contemplated although not necessarily required that each of the buffers 1-8 has the same total amount of storage capacity.

Once the atomic group is ready, the process moves to step (2) where an atomic write is scheduled and carried out at an appropriate time to transfer the user data and parity data to the respective destination storage devices 100. The write commands are issued independently so that the respective user data from buffers 1-5 and the parity data from buffers 6-8 are respectively written as required under the direction of the backend processor 176.

In a first scenario, no power or other anomalous condition arises during the write operation so that all of the data are successfully written and a write complete status is returned as discussed above. Thus, sequential steps (1) and (2) are carried out in turn as set forth above, and the buffers may be thereafter allocated for a new data set.

However, it is contemplated that in some circumstances power failures or other anomalous conditions can arise that interrupt either step (1) or step (2) in FIG. 11. That is, an anomalous condition can interrupt the generation of the atomic group, or interrupt the subsequent transfer of the completed atomic group to storage.

As noted above, a RAID5 write hole may exist if the parity data get out of synchronization (sync) with the user data. Write holes are minimized by the present disclosure based on the self-journaling data structures (hash table, stripe segment, cache segments) which are maintained in non-volatile memory. Once parity is computed, the state information within the cache segment reflects that the parity data have been computed for the group. At this point, the atomic group is complete so that, should a power failure occur during step (2) in FIG. 11, all that is necessary is to replay the writes; that is, the system merely repeats the transfer of all of the data from the respective buffers 1-8 to the respective storage devices after the resumption of normal system operation.

A power failure that affects the formation of the atomic group, that is, during and before the completion of step (1) in FIG. 11, requires additional analysis. In this case, a scan through the hash table for the status values of all of the data in the respective caches can determine the status of the data (old v. updated, etc.) as well as the parity data (whether parity data have been completed for the data). If incomplete, the system can operate to restart the comparison and recalculation operation by the state machine logic to finalize the atomic group, followed by the transfer of the data to media as before. A stepwise analysis through the hash table to the cache segments can enable the system to determine the current state of the system and resume processing necessary to complete the formation of the atomic group (step (1)), followed by the successful flushing of the data to storage (step (2)).

As noted above, large scale high I/O systems may involve multiple processes that concurrently attempt to operate upon regions where a common resource (e.g., set of data, etc.) is changing or being updated by one or more of the operating processes. One example of a common resource that may be accessed by multiple processes concurrently is a parity data set during ongoing data operations to different parts of a RAID stripe. Another common resource that may be concurrently required are those portions of data sets affected by a device failure during which the missing data from the failed device are being reconstructed.

Figure 12:
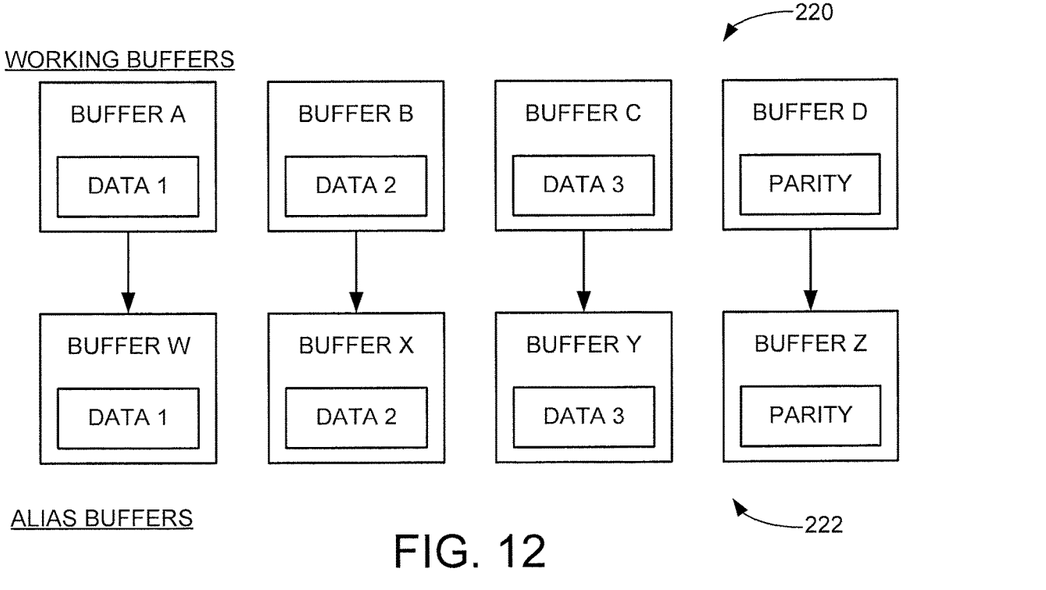
FIG. 12 shows a transfer of data from a working set of memory buffers to an alias set of memory buffers in accordance with various embodiments.

To manage this, the system further operates in accordance with some embodiments to generate alias cache segments just prior to the calculation of an updated parity set. FIG. 12 shows a simplified representation of four working buffers 220 (buffers A-D) that have been allocated for use in the generation of an atomic distributed data set formed of three user data blocks (data 1-3) and one parity block (parity). It will be recalled that the locations of these respective buffers and the associated data are tracked by the data structures discussed above.

At such time that the system is ready to calculate an updated parity value for buffer D (e.g., step (1) in FIG. 11), a set of alias buffers 222 can be generated and used. In some embodiments, the alias buffers represent a new, different set of buffers into which a copy of the contents of at least the user data are copied while maintaining the previous copy of the user data in the original buffers. Thus, using the simplified example of FIG. 12, the user data (data 1-3) in buffers A-C are copied over into buffers W-Y. The data in buffers A-C are retained. The parity data can also be copied from buffer D to buffer Z. Alternatively, a new buffer can be allocated for the parity data so that the data in buffers A-C and W-Z share the updated parity contents of a single parity buffer (so long as no write updates have occurred).

In this way, once the data sets data 1-3 have been transferred to buffers W-Y, a parity calculation can be carried out generate the parity data in buffer Z (and as desired, written to buffer D). The flushing of the atomic data set formed in buffers W-Z can thereafter be carried out as described above in step (2) of FIG. 11. In the meantime, cache reads can be serviced from buffers A-D, and write updates can be immediately applied to buffers A-C.

Thus, a first access command associated with a selected distributed data set (e.g., a selected RAID5 data set) can be processed, user data associated therewith can be loaded to the working set of memory buffers and maintained therein for use in satisfying subsequent access commands for that data set, and a duplicate set of the user data can be copied to the alias memory buffers for the flushing operation. It will be noted that while separate data buffers are contemplated, such is not necessarily required.

In some embodiments, different locations within the same buffer may be used as the new "alias" memory buffers. In other embodiments, the data can be moved to a new location and the data in the new location can be used to service the commands; however, this would require some changes to the hash table and stripe segment data structures, which could be easily accomplished. For purposes herein it will be understood that basically, two sets of the user data are maintained, one in a "working" set of memory buffers and one in an "alias" set of memory buffers. The working set is there to potentially satisfy subsequent requests (such as read cache hits and write updates) while the alias set is released for flushing to the storage media.

In a write intensive environment, it is contemplated that multiple sets of the alias set of memory buffers may be utilized as further write update commands are received. Thus for example, a set of user data may be received into a set of working buffers. A first set of alias buffers may be allocated to store a duplicate set of the data, followed by the generation of a first set of parity data. This atomic set of data may thereafter be scheduled for flushing to the storage devices. In the meantime, write updates may be received in a second access command. In such case, at an appropriate time a second alias set of memory buffers may be allocated to store the updated set of user data and a new parity set of data, followed by a subsequent write. In this way, write intensive environments can be managed while maintaining a sequence of the write operations and data integrity.

It is contemplated that even if the data in buffers A-C are in the process of being updated, the pending write operation from buffers W-Z will still be carried out. Any old data requirements can be satisfied either from the working buffers A-C or the alias buffers W-Y rather than requesting data from the back end. Nevertheless it is contemplated that this provides an efficient lockless caching mechanism since subsequent data accesses are not locked out of the system during the flushing operation and write updates are not delayed.

In sum, when cache segments are chosen to start a flush operation, the alias cache segments are created and used for the entire flush sequence including parity computation. This working set leaves all the cache segments belonging to the stripe to be independently updated for new writes. So essentially the flush operation is separated from write operation and they can independently operate even within overlapped region.

Various embodiments can further operate to provide protection for write updates on a degraded or overlapping region of a stripe. When a RAID logical volume is operating in a degraded mode, there are conditions where missing data belong to failed drive would be needed to serve either a flush commands or a read command. These regenerative read operating regions need to be protected so that only a single operation is performing the regeneration at any time.

One approach carried out by some embodiments is to utilize the caching mechanism described herein along with adding the cache segment corresponding to the missing stripe to the hash table and introducing a new state called "exclusive". Buffer segments that are covered by the operation requesting a regenerative read would be marked as exclusive. Any other operation that requires the use of overlapping buffer segments would be placed in a separate queue for execution after the completion of the data reconstruction operation.

Determining whether a given cache segment has been assigned the exclusive status can be carried out for a given access operation by performing a hash look up and scan operation within the stripe region associated with the access operation. If a hit is obtained, a check can be made to determine whether the buffer segments in question have been assigned the exclusive status. In some cases, actions may be carried out on remaining, non-overlapping portions of the data. If there is an overlap, the requested operations can be added to a standby queue. Once the current operation is finished, the standby queue is served in a first in first out (FIFO) order.

Figure 13:
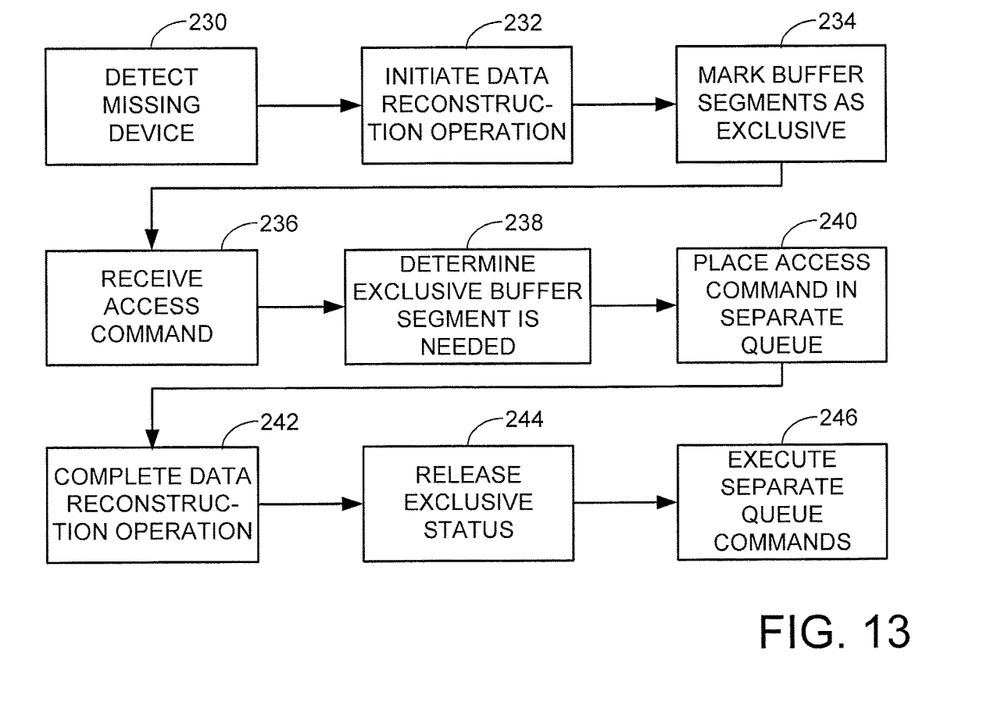
FIG. 13 is a flow diagram for a reconstruction operation in accordance with some embodiments.

FIG. 13 shows a flow sequence in accordance with the foregoing discussion. A failed (missing) device is detected at functional block 230. Various operations are performed to recover from the missing device including the construction of the respective user data and/or parity data that was previously stored on the missing device at block 232. The specific operations will depend on the configuration of the system but may include the reading of data sets from the other devices storing remaining portions of the distributed data sets, regeneration of the data, and the storage of the data on a new replacement device. It will be appreciated that, depending on system loading levels, the reconstruction operation may be time intensive.

As a result, the system operates as discussed above to identify those cache segments affected by the missing device and to mark those segments as exclusive, block 234. These segments can be described in a variety of ways, but it is contemplated that the LBA (or other logical) ranges can be readily identified based on the reconstruction operation and such ranges can be marked as exclusive such as by setting one or more bits in the status bitmap information (see 154, FIG. 6) for the respective cache segments.

During the data reconstruction process, an access command is received at block 236. A determination is made at block 238 whether one or more buffer segments associated with the received access command is required. This can be carried out as explained above by checking the exclusive status of the data segments in question. If an overlap is detected, the access command is deferred by placing the command into a separate queue, block 240.

The processing of the system continues until the reconstruction operation is completed, as shown by block 242, after which point the exclusive status for the affected blocks is rescinded at block 244 and the commands in the separate queue are executed at block 246.

Accordingly, features and advantages of the system architecture proposed by the disclosure is hardware driven and can be built with simple pipelined architecture; it uses simple data constructs to tie all the information belonging to a stripe; it provides plan based IO flows makes it easy to codify and execute in hardware; a hash based mechanism is used to detect both IO region overlap and stripe level overlap; it has built-in write hole protection with self-journal data structures and use of non-volatile memory; and a lock-less cache based mechanism to detect and protect critical common resource from being manipulated by multiple processes.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising:
   a plurality of storage devices defining an overall available memory space for storage of data in the form of distributed data sets in which user data and parity data are striped across the storage devices;
   a plurality of memory buffers, the memory buffers arranged as a working set of the memory buffers and an alias set of the memory buffers; and
   a control circuit configured to, responsive to a command associated with a selected distributed data set, store a first copy of user data from the selected distributed data set in the working set of the memory buffers, the control circuit further configured to implement lock-less caching of the selected distributed data set by storing a duplicate, second copy of the user data in the alias set of the memory buffers, generating parity data based on the second copy of the user data in the alias set of the memory buffers, storing the generated parity data in the alias set of the memory buffers and in the working set of the memory buffers, flushing the second copy of the user data and the parity data from the alias set of memory buffers to the storage devices, and servicing a second access command associated with the selected distributed data set using the first copy of the user data in the working set of the memory buffers during the flushing of the second copy of the user data and the parity data from the alias set of memory buffers to the storage devices.

2. The apparatus of claim 1, further comprising a memory configured to store a data structure in the form of a hash table that describes the overall available memory space using consecutive slots, each slot defining a different successive range of logical addresses of the memory space and storing at least one stripe segment that identifies an associated buffer.

3. The apparatus of claim 2, wherein the control circuit is further configured to compute an upper slot and a lower slot of the hash table corresponding to the selected distributed data set, to retrieve the status values for data stored in the buffers identified in and between the upper and lower slots, and to update the selected distributed data set responsive to the status values.

4. The apparatus of claim 2, wherein each stripe segment comprises an address to a plurality of the memory buffers each configured to store a different portion of user data or parity data associated with an associated distributed data set and a status value associated with the different portion of the user data or parity data.

5. The apparatus of claim 4, wherein each of the plurality of the memory buffers further stores a status value indicative of whether the associated different portion of the user data or the parity data is associated with a reconstruction operation to recover data responsive to a failed one of the plurality of storage devices.

6. The apparatus of claim 1, wherein each memory buffer in the plurality of memory buffers has the same total amount of storage capacity.

7. The apparatus of claim 1, wherein the first access command is a write command and the second access command is also a write command, wherein the control circuit is further configured to update the user data in the working set of memory buffers to form updated user data associated with the selected distributed data set, to store a duplicate set of the updated user data in a second alias set of the memory buffers while maintaining the updated user data in the working set of memory buffers.

8. The apparatus of claim 1, wherein the first access command is a write command and the second access command is a read command, and wherein the control circuit is further configured to satisfy the second access command by providing a read hit from the working set of memory buffers.

9. The apparatus of claim 1, wherein the plurality of storage devices comprise solid-state drives (SSDs).

10. The apparatus of claim 1, wherein responsive to an anomalous condition the control circuit is further configured to replay a series of write operations to transfer the user data and the parity data from the alias set of memory buffers to the storage devices.

11. The apparatus of claim 1, wherein the control circuit comprises a memory buffer management circuit configured to access a hash table which stores a data structure which describes a memory space defined by the storage devices, a cache manager circuit which calculates the parity data and a backend processor circuit which transfers the selected distributed data set to the storage devices from the alias memory buffers responsive to the cache manager circuit.

12. A distributed data storage system comprising:
a plurality of data storage devices; and
a storage server connected to manage the data storage devices, comprising a plurality of memory buffers, and a control circuit configured to store a first copy of user data associated with a selected distributed data set in a first set of the memory buffers responsive to a first access command, the control circuit further configured to implement lock-less caching of the selected distributed data set by duplicating the user data to form a second copy of the user data in a second set of the memory buffers, generating parity data responsive to the second copy of the user data and storing the parity data in the first set of the memory buffers and in the second set of the memory buffers, flushing the second copy of the user data and the parity data from the second set of memory buffers to the storage devices, and servicing a subsequent access command associated with the selected distributed data set by writing updated user data to the first copy of the user data in the first set of the memory buffers.

13. The distributed data storage system of claim 12, further comprising a memory which stores a hash table having a plurality of entries, each entry comprising a stripe segment associated with a different one of a plurality of distributed data sets, the stripe segment having a plurality of cache segment addresses each pointing to a different one of the memory buffers in which the different one of the plurality of distributed data sets is stored.

14. The distributed data storage system of claim 12, wherein responsive to an anomalous condition the control circuit is further configured to replay a series of write operations to transfer the user data and the parity data from the second set of memory buffers to the storage devices.

15. The distributed data storage system of claim 12, wherein the control circuit comprises a memory buffer management circuit configured to access a hash table which stores a data structure which describes a memory space defined by the storage devices, a cache manager circuit which calculates the parity data and a backend processor circuit which transfers the selected distributed data set to the storage devices from the alias memory buffers responsive to the cache manager circuit.

16. A computer implemented method comprising:
receiving a first access command to store a selected distributed data storage set as striped user data and parity data blocks across a plurality of data storage devices each having a non-volatile memory (NVM);
storing the user data in a first set of memory buffers;
implementing a lock-less cache arrangement of the selected distributed data storage set by copying the user data to a second set of memory buffers while retaining the user data in the first set of memory buffers and generating parity data responsive to the user data in the second set of memory buffers and storing the parity data in the second set of memory buffers and in the first set of memory buffers; and
flushing the user data and the parity data from the second set of memory buffers to transfer the user data and the parity data from the second set of memory buffers to the NVM of the data storage devices while servicing a second access command associated with the distributed data set using the first set of memory buffers.

17. The method of claim 16, further comprising using the copy of the parity data in the first set of memory buffers to service the second access command.

18. The method of claim 16, wherein the first access command is a write command and the second access command is also a write command, and the servicing of the second access command comprises updating the user data in the first set of memory buffers to form updated user data associated with the selected distributed data set, and storing a duplicate set of the updated user data in a third set of the memory buffers while maintaining the updated user data in the first set of memory buffers.

19. The method of claim 16, wherein the first access command is a write command and the second access command is a read command, and wherein the servicing of the second access command comprises returning data as a cache hit from the first set of memory buffers.

20. The method of claim 16, wherein the first and second access commands are associated with a regeneration operation to regenerate data associated with a failed data storage device, wherein a controller assigns an exclusive status to the first set of memory buffers during the regeneration operation, and wherein a third access command associated with the first set of memory buffers is placed in a separate queue pending completion of the regeneration operation.

* * * * *